United States Patent [19]

Kadison et al.

[11] Patent Number: 4,500,552
[45] Date of Patent: Feb. 19, 1985

[54] GELATIN DESSERT PRODUCT

[75] Inventors: Sylvan Kadison; David Scheiner, both of Chicago, Ill.

[73] Assignee: Kadison Laboratories, Inc., Chicago, Ill.

[21] Appl. No.: 503,816

[22] Filed: Jun. 13, 1983

[51] Int. Cl.³ .............................................. A23L 1/04
[52] U.S. Cl. ...................................... 426/96; 426/98; 426/576; 426/103
[58] Field of Search ................. 426/576, 570, 565, 96, 426/98, 103

[56] References Cited

U.S. PATENT DOCUMENTS

| | | | |
|---|---|---|---|
| 3,434,848 | 3/1969 | Katz | 426/570 |
| 3,579,355 | 5/1971 | Wyss | 426/576 |
| 3,582,357 | 6/1971 | Katz | 426/570 |

OTHER PUBLICATIONS

Knox Gelatin, "Spanish Cream or Molded Custard", 1927, p. 24.

Primary Examiner—Jeanette Hunter
Attorney, Agent, or Firm—Wallenstein, Wagner, Hattis, Strampel & Aubel

[57] ABSTRACT

A gelatin dessert product capable of providing a clearly demarcated two-layered, two-colored dessert in a single step.

7 Claims, No Drawings

GELATIN DESSERT PRODUCT

The present invention relates to a gelatin dessert product in dry, free-flowing, finely-divided, or granular, form which, upon being dissolved in hot water and chilled, provides a clearly demarcated two-layered, two-colored gelatin dessert.

In preparing a gelatin dessert having two, or more, layers comprising different colors, it is necessary to dissolve and chill each layer separately. A product intended to meet the demand for an easier way to make a multi-layered gelatin dessert has been sold under the trademark "JELL-O" (General Foods), and designation "One, Two, Three". The product comprised a single package which contained three separate packets of gelatin, each packet containing a different colored, and flavored, gelatin. While the necessary ingredients were provided in a single, convenient package, it was still necessary to dissolve and chill each packet of gelatin separately to obtain the desired multi-layered effect.

In accordance with the present invention, a gelatin dessert product has been evolved which, in a single step, enables a two-layered, two colored gelatin dessert to be prepared. The distinctive layers formed with the product not only are different in color, but, also, are different in texture and other physical properties. The product of this invention resembles conventional gelatin dessert products, such as the product "JELL-O," in that it is dry, free-flowing, substantially homogeneous, and finely-divided, or granular. It is also resembles conventional gelatin dessert products in that it is formed into a gelatin dessert by first dissolving it in hot water, followed by chilling. However, totally unlike conventional gelatin dessert products, the product of this invention, during chilling, forms two distinctive, clearly demarcated, differently colored layers which impart a unique and attractive appearance to the dessert, and which, together, impart a wholesome taste and palate-pleasing texture to the dessert.

The product, in brief, contains, as essential ingredients, a sugar, a dry edible oil, especially a dry vegetable oil, gelatin, a quick setting agent, and one, or more, flavoring agents. Minor amounts of other ingredients advantageously are incorporated to improve the taste and texture of the top layer, in particular, of the dessert. The dessert formed from the product of this invention is characterized in that it has a lower or bottom layer which has the texture, taste and appearance of a conventional gelatin dessert of the same flavor, and an upper or top layer which has a smooth, creamy texture, and an appearance and color which is totally different from the lower or bottom layer, while at the same time having essentially the same flavor as the lower or bottom layer. The dessert formed from the product is further characterized in that the lower or bottom layer, generally speaking, will be about five or six, to about eight times thicker than the upper or top layer of the dessert.

Of the essential ingredients used in formulating the product of this invention, sugar comprises the major component, usually about 50% to about 70%, preferably about 55% to about 65%, by weight, of the product. Sucrose, glucose, and other sugars such as dextrose may be used. Granulated cane sugar (sucrose), however, is preferred.

The dry edible oil component of the product can be selected from a wide group of such oils. Included in this group are vegetable oils such as coconut oil, palm oil, soya bean oil, sesame seed oil, safflower oil, peanut oil, corn oil, cottonseed oil, olive oil, banana oil, and mixtures thereof. Other oils which can be used are whale oil, bone oil, egg oil, and other animal or animal derived oils. The oil employed may be hydrogenated, or partially hydrogenated. The preferred oil is partially hydrogenated coconut oil. Drying of the oil desirably is accomplished by mixing the oil with an inert carrier such as corn syrup solids, milk solids, wheat starch, or the like. The preferred vehicle is corn syrup solids. The oil is mixed with the carrier and sufficient water to enable it to pass through a nozzle, for example, of a spray dryer. A drum dryer may be used, but is less preferred. The dried mixture, generally speaking, will comprise about 40% to about 60%, usually about 45% to about 50%, by weight, of the oil employed. The proportion of the dry oil, which includes the inert carrier, or vehicle, used in formulating the gelatin dessert product will be in the range of about 15% to about 40%, preferably about 20% to about 30%, by weight, of the total weight of the end product.

The gelatin component of the product desirably will comprise about 5% to about 15%, preferably about 8% to about 10%, by weight, of the product. The gelatin advantageously is the equivalent, from the standpoint of purity and physical properties, to the gelatin used in formulating standard gelatin dessert products such as the product sold under the trademark "JELL-O".

The quick setting agent used in the product of this invention is a normally solid or crystalline, water soluble organic dibasic acid. Exemplary of organic dibasic acids which can be used are adipic acid, fumaric acid, maleic acid and malonic acid, and compatible mixtures thereof. Adipic acid is especially preferred. The quick setting agent has the dual function of both acting to accelerate gelling or setting of the gelatin component of the product, and to adjust the pH of the dessert to a level, usually below about 6, and preferably about 4 to about 5, to impart a tartness which enhances the flavor of the dessert. The amount of the quick setting agent used will be of the order of about 1% to about 3%, preferably about 2%, by weight, of the product.

The flavor of the gelatin dessert can be enhanced by incorporating a food grade acid into the product. Typical of such acids are citric acid, tartaric acid, ascorbic acid, and isoascorbic acid, and mixtures thereof. Citric acid is preferred for this purpose. The amount of acid used can range from about 0.5% to 1.5%, usually about 1%, by weight of the product.

The properties of the upper or top layer of the gelatin dessert formed with the product of this invention can be enhanced from the standpoint of its smooth, creamy texture and taste by adding a small amount of sodium bicarbonate, and a small amount of a powdered milk, or non-dairy creamer to the product. Sodium bicarbonate, when used, will comprise about 0.2% to about 0.9%, usually about 0.4% to about 0.6%, by weight, of the product. The powdered milk, or non-dairy creamer, will comprise about 0.5% to about 2%, preferably about 1%, by weight, of the product.

An emulsifying agent desirably is added to the product to improve the rapid formation of the upper or top layer of the dessert, and to aid in the development and stabilization of its smooth, creamy texture. Exemplary of emulsifiers which can be used are mono- and diglycerides. The mono- and diglycerides sold under the designation "DUR-EM 207" (Durkee) are especially preferred. The quantity of emulsifying agent employed is small, usually being of the order of about 0.5% to about 1%, preferably about 0.6% to about 0.8%, by weight, of the product.

A wide variety of flavoring and coloring agents of the type employed in the formulation of conventional gelatin dessert products can be used in making the product of this invention. Typical flavors and colors include cherry pink, raspberry red, strawberry, lime green, orange gold, lemon yellow, chocolate milk, coffee, to mention a few. The flavoring and coloring agent, together, will comprise from about 1% to about 2%, usually about 1.2% to about 1.6%, by weight, of the product.

Other flavoring agents such as salt, as well as conventional food product additives such as sodium caseinate, dipotassium phosphate and carragheen may be added in small amounts, of the order 0.5% to about 1 or 2%, by weight, to the product.

The following examples are illustrative of gelatin dessert products falling within the scope of this invention. It should be understood that other formulations can be evolved following the guiding principles and teachings provided herein. The numerical values represent weight percent.

EXAMPLE 1

| Ingredient | Wt. % |
| --- | --- |
| Sugar (sucrose) | 60 |
| Vegetable oil (spray dried coconut oil and corn syrup solids vehicle) | 25 |
| Gelatin | 8 |
| Adipic acid | 2 |
| Non-fat dry milk | 1 |
| Citric acid | 1 |
| Emulsifier (DUR-EM 207) | 0.8 |
| Sodium bicarbonate | 0.6 |
| Flavoring (imitation cherry) and coloring (U.S. certified) agents | 1.6 |

A package containing 24 ounces of the above product was dissolved in 1 gallon of boiling water with stirring. The solution was poured into clear glass serving dishes and chilled until firm. Each dish contained two clearly demarcated and distinctively colored layers. The lower or bottom layer in each dish was red and was approximately 3 inches in height. The upper or top layer in each dish was pink and was approximately ¾ inch in height. The upper or top layer had a smooth, creamy texture.

EXAMPLE 2

| Ingredient | Wt. % |
| --- | --- |
| Sugar (sucrose) | 55 |
| Vegetable oil (spray dried palm oil and milk solids vehicle) | 30 |
| Gelatin | 10 |
| Fumaric acid | 1 |
| Non-fat milk solids | 0.5 |
| Ascorbic acid | 1.5 |
| Emulsifier (DUR-EM 207) | 0.5 |
| Sodium bicarbonate | 0.5 |
| Flavoring (lime) and coloring (U.S. certified) agents | 1 |

A 24 ounce package was dissolved in hot water and chilled as in Example 1. The dessert in each dish comprised a lower or bottom layer having a lime green color, and an upper or top layer having a distinctive light green color. The upper layer was about ½ inch thick, the lower layer about 2½ inches thick. The lower layer had the consistency of a conventional gelatin dessert, while the upper layer was creamy and had a pleasant lime flavor.

What is claimed is:

1. A gelatin dessert product in the form of a dry pulverulent mixture capable, when dissolved in hot water and then chilled, of providing a flavored gelatin dessert having two clearly demarcated layers, each having a distinctly different color, comprising, as essential ingredients: about 50% to about 70%, by weight, sugar; about 15% to about 40%, by weight, of a dry edible oil component in the form of a dry mixture of an edible oil and an edible inert carrier wherein the edible oil comprises about 40% to about 60%, by weight, of the dry mixture; about 5% to about 15% gelatin; about 1% to about 3% of a quick setting agent in the form of a water soluble organic dibasic acid, for the gelatin; and about 0.5% to about 1.5% of a food grade acid.

2. A dessert product according to claim 1 wherein the dry edible oil is one of the following: coconut oil, palm oil, safflower oil, sesame seed oil, soya bean oil, peanut oil, corn oil, cottonseed oil, olive oil, banana oil, whale oil, bone oil, egg oil, or a mixture thereof.

3. A dessert product according to claim 1 wherein the organic dibasic acid is selected from the group consisting of adipic acid, fumaric acid, malonic acid, maleic acid, and mixtures thereof.

4. A dessert product according to claim 1 wherein the flavoring agent is a food-grade acid selected from the group consisting of citric acid, tartaric acid, ascorbic acid, and isoascorbic acid, and mixtures thereof.

5. A dessert product according to claim 1 wherein the dry edible oil component comprises a spray dried mixture of partially hydrogenated coconut oil and corn syrup solids.

6. A gelatin dessert product in the form of a dry pulverulent mixture capable, when dissolved in hot water and then chilled, of providing a flavored gelatin dessert having two clearly demarcated layers, each having a distinctly different color, comprising, about 50% to about 70%, by weight, sugar; about 15% to 40%, by weight, of a dry edible oil component in the form of a dry mixture of an edible oil and an edible inert vehicle wherein the edible oil comprises about 40% to about 60%, by weight, of the dry mixture; about 5% to about 15%, by weight, gelatin; about 1% to about 3%, by weight, of a water soluble organic dibasic acid; about 0.5% to about 1.5%, by weight, of a food grade acid; about 0.5% to about 2%, by weight, of powdered milk; about 0.5% to about 1%, by weight, of an emulsifying agent; and about 1% to about 2%, by weight, of a flavoring agent.

7. A gelatin dessert product according to claim 6 wherein the product contains about 0.2% to about 0.9%, by weight, of sodium bicarbonate.

* * * * *